March 15, 1960     O. MARKOWITZ     2,928,996
TECHNIQUES TO DEACTIVATE A GENERATOR AFTER A FAULT
Original Filed Sept. 13, 1951     2 Sheets-Sheet 1
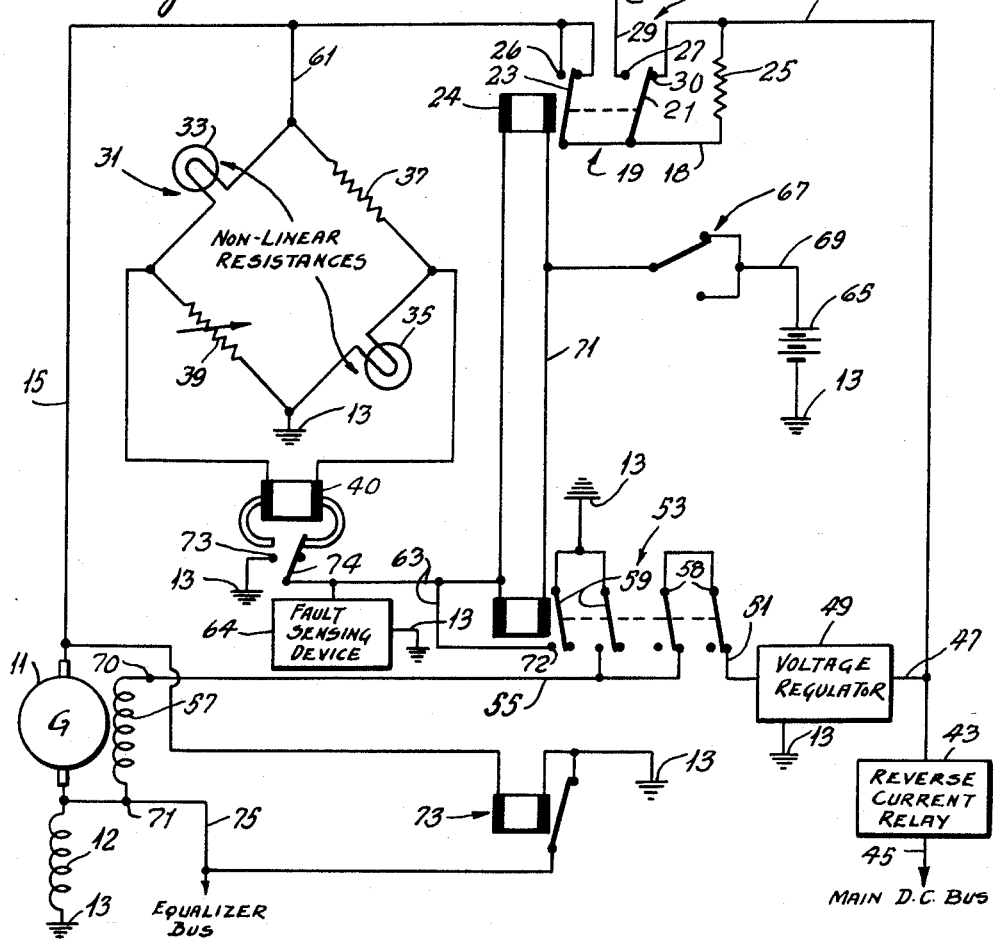
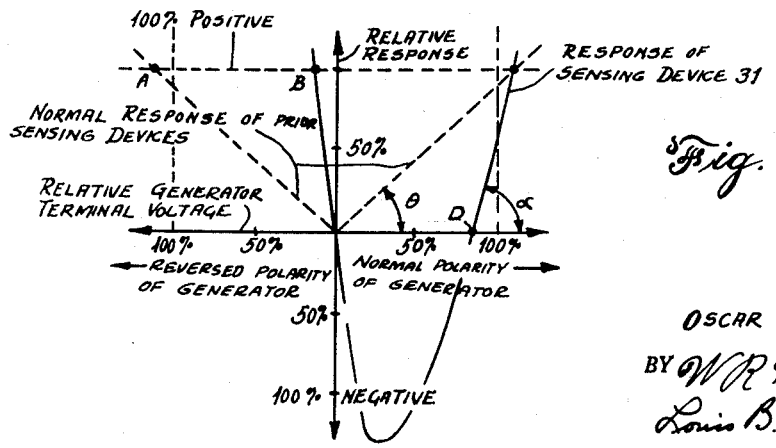
INVENTOR.
OSCAR MARKOWITZ
ATTORNEYS March 15, 1960     O. MARKOWITZ     2,928,996
TECHNIQUES TO DEACTIVATE A GENERATOR AFTER A FAULT
Original Filed Sept. 13, 1951     2 Sheets-Sheet 2

INVENTOR.
OSCAR MARKOWITZ
BY
ATTORNEYS

United States Patent Office 2,928,996
Patented Mar. 15, 1960

2,928,996

TECHNIQUES TO DEACTIVATE A GENERATOR AFTER A FAULT

Oscar Markowitz, Philadelphia, Pa.

Original application September 13, 1951, Serial No. 246,498, now Patent No. 2,855,546, dated October 7, 1958. Divided and this application May 29, 1956, Serial No. 588,192

7 Claims. (Cl. 317—13)

(Granted under Title 35, U.S. Code (1952), sec. 266)

The invention described herein may be manufactured and used by or for the Government of the United States of America for government purposes without the payment of any royalties thereon or therefor.

This invention relates to improvements in means to detect faults in electric power systems, and more particularly pertains to devices for fault control and protection of self-excited D.-C. generators after either a full-field short-circuit fault, a generator feeder fault, or another type of fault has been detected. This is a division of my copending application Serial No. 246,498, filed September 13, 1951, for Method and Circuit Techniques to Deactivate a Generator After a Fault, and now Patent No. 2,855,546. The circuitry employed provides a novel means of purposely applying short circuits between the different generator output terminals in a predetermined sequence, thereby disabling the power-generating capabilities of the machine.

As the operating voltage and output power of aircraft electrical systems have been increased, so have their interruption requirements. Mere increase of the size of the interrupting device, and the provision of some form of back-up protection, have proven to be deficient and complicated when used as circuit protectors. There have been cases of generator contactor failure caused by insufficient arc-interrupting capacity or contact welding. Even with normal contactor operation during faulted conditions, there have been no means to deenergize the generator completely for all types of faults. The desideratum of providing protection equipment for a self-excited D.-C. generator which, after a full-field shorting fault, would reduce the generator terminal voltage to zero, or, after a generator feeder fault, would reduce the current output of the machine essentially to zero, is not afforded by presently available equipment and circuits.

Previous protection circuits have been inadequate for full-field shorting faults, which allow complete shunt-field excitation after all fault control circuits have been opened, and for generator feeder faults, which permit heavy currents to feed the fault continuously when there is sufficient current in the series field to provide the required internal flux. In both cases the power loops remain closed, even after disconnections have been made between the generator and the main bus.

In order to control a generator after such faults, its internal magnetic flux should be reduced to the point where no electrical power can be generated. Purposeful shorts to bypass the currents that allow the continuation or secondary build-up of internal flux can accomplish this end:

To provide a shunt-field short, the field circuit between the short and the generator bus must first be open-circuited. The short will then provide a bypass for current which might flow through the shunt field during a full-field shorting fault. During other types of faults, the short will provide a field-energy discharge path, substantially helping other hereinafter described simultaneous actions in reducing terminal voltage, at the same time assuring that there will be no reversed residual flux remaining in the generator. (Such a short, by itself, will not reverse the residual flux of the generator because of inherent shunt-field inductance, resistance and hysteresis.)

An armature short can carry armature current past the breakdown point on the external characteristic of the generator and near its point of zero terminal voltage. The self-excited generator cannot continue to supply excitation under such conditions. The actual transient current during application of the short are determined by the field flux conditions during that period, the transient opposition to that flux created by the demagnetizing component of the armature magnetomotive force, and circuit inductivity. The undesirable fetaure of such a short, by itself, is that the shorting current can, under certain conditions, produce enough demagnetizing component together with the circuit inductivity to reverse the residual flux of the generator. But before this armature short can be applied, the circuit between the generator and other paralleled sources of power such as a battery or another generator must be conditioned so that no power, or only a small predetermined amount of power, can be fed back to the short from these other sources. This requirement can be met with a contactor that opens the circuit between the short and the main bus. In addition, a resistor placed across the contacts of this contactor will decrease the current to a value that will allow for the proper operation of the reverse-current relay used normally with the system after completion of the short. This resistor so placed also reduces the arc interruption requirements for a given current.

A generator feeder-to-ground short accomplishes essentially the effect of the armature short, and requires the same circuit preparation. The difference lies in that the shorting currents now flow through the different series-connected windings of the machine as well as the armature itself. These windings limit the flux distortion caused by armature current and also contribute to the in-line shunt-field flux, thus avoiding completely the possibility of reversed residual flux. However, this short alone can permit the generator current to maintain itself above midspeed.

The generator equalizer terminal, which is connected internally to the negative brush or to a point close to the negative brush, is brought out generally as an external terminal. A short from this equalizer terminal to ground will bypass an effective proportion of the current flowing through the series-connected windings. If this short is accomplished after the generator feeder-to-ground short has been completed, it will bypass sufficient current to avoid current self-excitation of the machine so that the shorts will not be fed with power after the initial transient. The equalizer bus connection to the other elements of the electrical system must be disconnected in a known manner from the generator during and after the control process to minimize voltage disturbances at the bus.

The principal object of this invention is to provide, in accordance with the foregoing functional desiderata, an improved means of sensing controlling and limiting such faults as overvoltage and reversed polarity of a self-excited D.-C. generator, and other faults.

Another object is to provide an overvoltage sensing device for a self-excited D.-C. generator that, in the same integral device, senses a faulted generator if reversed polarity starts to build up before any substantial terminal voltage has been attained, and that senses generator overvoltage at its normal polarity within a voltage margin not ordinarily obtained through existing devices.

A further object is to provide an overvoltage controlling device for a self-excited D.-C. generator wherein the intentional decay of the generator terminal voltage can be accomplished for all fault conditions more rapidly under less favorable conditions, and with inherent limitation of circuit values to much safer quantities than is possible with existing devices.

Still another object is to provide an overvoltage-sensing device for a self-excited D.-C. generator wherein the same simple circuitry effects disconnection and removal of generator excitation before any substantial terminal voltage is obtained in the case of build-up of the generator voltage in the reversed direction.

Other objects and many of the attendant advantages of this invention will be readily appreciated as the same becomes better understood by reference to the following detailed description when considered in connection with the accompanying drawings wherein:

Fig. 1 is a circuit diagram of an overvoltage-sensing and fault control device for a self-excited D.-C. generator, showing a preferred embodiment of the invention; and Fig. 2 is a chart showing the response curve of the overvoltage-sensing component of the device for conditions of overvoltage or generator reversed polarity.

Figure 3:
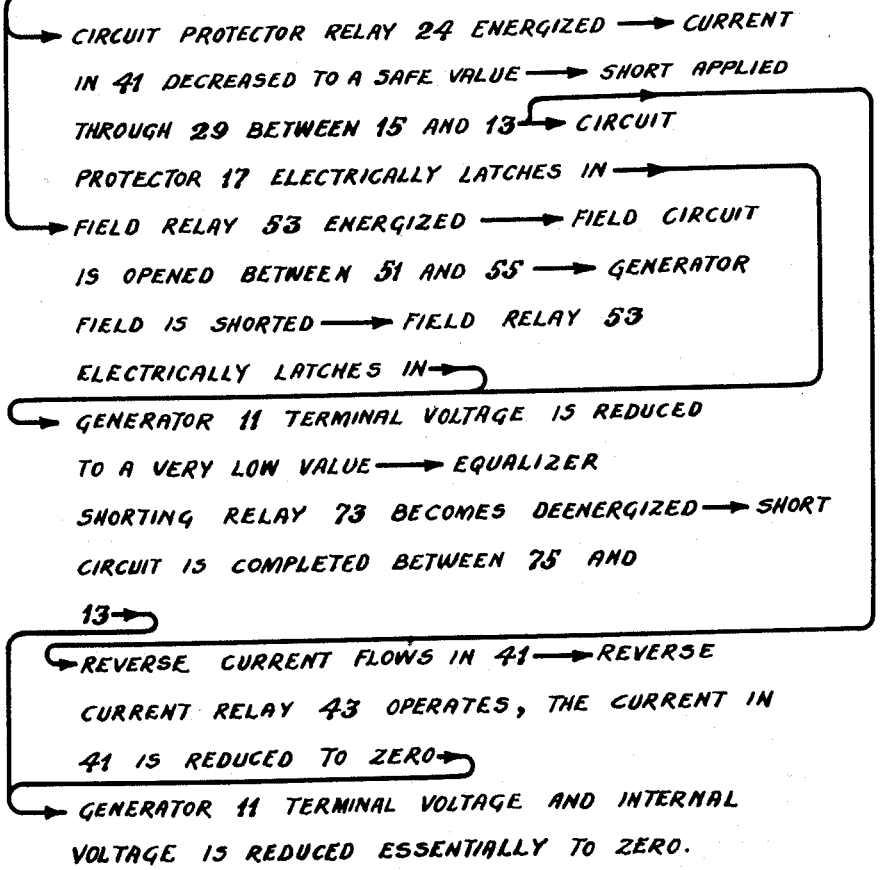
Fig. 3 is an outline describing a complete physical and electrical sequence of operation of an embodiment of the invention.

The subject device controls any abnormal and undesired system operation that requires system disconnection of the generator from the bus and reduction of its generated current and/or its terminal voltage by attenuating the live bus current to a safe limiting value for a predetermined transient period, disconnecting the field winding of a generator and providing shorts across the various output terminals of the generator, all in a predetermined sequence. The circuits and the device accomplishing these functions are timed in a manner adapted to obtain disconnecting actions between the generator and the bus in addition to their usual and normal circuit functions, and electrical latching means are provided to afford a non-repetitive cycle of circuit resetting operation, each actuation furnishing a novel trip-free, single cycle reset.

In the system shown in Fig. 1, generator 11 having compensating and series field winding 12 is connected between ground 13 and bus 15. Bus 15 is in turn connected to the circuit protector or contactor 17, which is a normally closed circuit breaker having a double break contact arm 19 that is biased mechanically so that contact 21 operates sooner than contact 23. When relay 24 is energized, bus 15 is connected with contact 23 through contact 26. Circuit protector 17 is further provided with a pigtail connection 18 from the arm 19 to a resistor 25 that is connected to the contact 21, thus allowing resistance to remain in the circuit during its initial break and consequently limiting circuit current during control actions to be tied in with the subsequent action of a reverse-current relay. Included also as part of the circuit protector is a normally open contact 27 which, after the energizing of the contactor 17 establishes the connection between bus 15 and ground 13 through a branch 29.

When protector 17 is opened, resistor 25 is connected between contact 26 and bus 41.

Bus 15 is also connected to a sensing device 31, which comprises a non-linear bridge and a relay 40, the combination having a dual-polarized action by virtue of both bridge operation and relay construction. Said dual-polarized action represents the action of the non-linear bridge which is polarized because it is capable of producing either a plus or minus voltage from a null or balance condition and the polarized relay 40 which will only respond to bridge unbalances of a positive voltage (points B and C of Fig. 2). The non-linear voltage and current response characteristics of the lamps 33 and 35, which are of the tungsten-filament variety (24 volts, 3 candle-power) as coupled with resistance 37 and variable resistance 39, provide an inherently more accurate operation than devices of this art heretofore employed, since the ampere turns that initiate operation start from zero at a voltage level close to the normal operating-voltage of the generator, approximately 80% of terminal generator voltage as shown at point D in Fig. 2, whereas overvoltage relays heretofore employed begin to respond at zero volts. In addition to overvoltage fault sensing, fault sensing of generator reversed polarity by said device 31 is provided: This fault is detected at such a low voltage in generator build-up (point B of Fig. 2) as to assure a fault sensing with consequent control before other normal circuit relays can close and cause damage.

As shown in Fig. 2 which charts the locus of sensing voltage of the subject device in solid lines and the locus of sensing voltage of such prior devices in broken lines as relative response against relative generator terminal voltage, the contributing ampere turns of the polarized relay 40 start at the condition of bridge balance, which can be at any predetermined value. Point D in Fig. 2 represents the zero point or bridge balance of sensing device 31 and is approximately at 80% of terminal generator voltage. This predetermined value can be shifted by adjustment of variable resistor 39. The bridge thus is used to obtain polarity difference during normal operation and faults operation. Points A and C being the points of ultimate response for prior devices, and points B and C being the points of ultimate response for the subject device, it is apparent that, since tan α is much greater than tan θ, the subject device is inherently more accurate for any given manufacturing tolerance.

The bus 41 continues from the load terminal 30 of the circuit protector 17 to the reverse-current relay 43 and then to the main power bus section 45. The usual control circuit branches off from bus 41 through conductor 47 to a suitable properly grounded voltage regulator 49, which can be of the well-known carbon-pile type, and continues through conductor 51 to the field-control relay 53, and thence through conductor 55 to the generator field winding 57. Said field-control relay 53, in addition to its customary functions of connecting said winding 57 to voltage regulator 49 through a ganged pair of contacts 58 under normal operating conditions, has an additional ganged pair of contacts 59 that close when energized. Said contacts 59, when closed, provide a short circuit between the generator field terminal 70 and its return terminal 71 as they are brought out from the generator, the circuit arrangement consisting of electrical latching contacts 72 and 59 for the same field-control relay. The single-pole double-throw switch 67 and relay provide electrical, and not mechanical, trip-free latching by utilizing the open-circuiting time when the toggle travels from one to the other throw momentarily opening the circuit to release the electrical latch of the relay, thereby resetting the circuit to a position ready for normal operation, as is hereinafter more fully explained.

The sensing device 31 is connected to bus 15 by conductor 61 and then to ground 13. Its sensing is obtained between lead 61 connected to bus 15 and ground 13. The unbalance in the non-linear bridge activities relay 40 thereby completing the circuit between lead 63 and ground. Energization of the field relay 53 is accomplished through a separate source of electrical power such as battery 65 connected between ground 13 and a reset switch 67 through lead 69 and thence to the coil of field control relay 53 and the circuit protector 17 through lead 71. Said reset switch 67 is a single-pole double-throw snap-action toggle switch of the non-shorting type having no midway position, so that upon actuation there is a circuit interruption of short duration between the contact transfer from one extreme switch position to the other. Other fault-sensing means, such as a current differential fault-sensing device 64 for sensing a line fault can be utilized in conjunction with the fault-sensing means 31. The output of such device is connected to wire 63 and upon sensing a line fault, connects wire 63 to ground similar to the operation of relay 40, thereby energizing protector 17 and field relay 53 in a manner similar to sensing device 31.

The sensing device 31 will respond to ground lead 63 by connecting contact 74 to contact 73 through the energization of relay 40 when either an overvoltage fault has occurred or when the generator polarity has been reversed. The field relay 53 through its connecting lead 63 and the circuit protector 17 through its connecting lead 63 are completed simultaneously, energizing the field-control relay 53 and the circuit protector 17 and remaining latched electrically. Terminal 70 of the field circuit is open between conductors 51 and 55, and the field circuit is grounded between conductor 55 and ground 13. The bus circuit is open between bus 15 and bus 41. The bus 15 is shorted to ground through lead 29 and, after terminal voltage is reduced substantially to zero, the equalizer shorting relay 73, whose contacts are biased toward the closed position, thereby shorting the generator equalizer terminal 75 to ground in its deenergized position. It is to be noted that self-excited generators on modern aircraft cannot be properly deactivated with a single short circuit placed across any two terminals of the generator. In order to effectively deactivate generator 11 while it continues to rotate at normal operating speed, more than one short is required. The short between bus 15 through lead 29 to ground 13 reduces the terminal voltage of generator 11, thereby reducing the source of shunt excitation and the flux attributable to shunt field 57. However, said short allows shorting current to flow through series field 12 which creates sufficient flux to excite generator 11, allowing a continuous heavy current flow through the armature, bus 15, ground 13, and series field 12. Said current is of sufficient level to cause a fire in generator 11 if allowed to continue. By providing a second short such as is accomplished by equalizer relay 73 which functions to by-pass current away from series field 12 and thus reduce the flux of said field, the generator is completely deactivated. Further, the short across shunt field 57 assists in providing a discharge path when the shunt field is suddenly reduced and at the same time helps to keep the residual flux from reversing. Through this control action, the generator terminal voltage has been reduced essentially to zero, its current reduced essentially to zero and the terminals have been disconnected from bus 41 and bus 45.

In Fig. 3 there is shown a complete physical and electrical sequence of operation of the invention. It is evident that the reverse current from the main D.-C. bus 45 must be supported by other paralleled sources of D.-C. power also connected to the main bus. Other sources of power on the main bus are normal for aircraft, since most planes have more than one D.-C. generator and at least one battery paralleled through the main D.-C. bus. It is also clear that the short between the D.-C. generator bus and ground allows current to be fed back through the reverse current relay to ground, such discharge being limited appropriately by the resistor 25. This reverse current, flowing from the main bus toward the D.-C. generator bus, operates the internal controls of the reverse current relay to open the connection between the main D.-C. bus 45 and the bus 41. Reset operation of the bus-shorting relay and field-shorting relay has no bearing on the action of the reverse current relay, since its action to reclose occurs only when the proper voltage conditions exist on bus 41. Thus, circuit coordination exists between the shorting techniques and the reverse current relay in that, after a fault, the reverse current relay does not operate to open the bus circuit until the exchange of power between generator and main bus has been reduced to a predetermined safe value and this exchange of power is in the proper direction.

To reset the circuits, the reset switch 67 opens the circuit momentarily between lead 69 and lead 71, thereby releasing the electrical latching provisions of the field relay 53 and the circuit protector 17, returning all of their contacts to the normal positions and thereafter allowing all circuits to assume their normal functions.

If the fault initiating the sensing still exists, then the entire circuit again goes through the described protective operation. If the fault, providing sensing, has ceased to exist, the field protective relays will assume their normal positions, and the circuit protective relays will remain at their normal positions. If the reset switch 67 is held intentionally in one position or the other while the fault causing the sensing still exists, then only one cycle of protective operation will be completed. If a second reset cycle is desired, it will be necessary to operate the reset switch a second time. Thus the device provides fool-proof single cycle trip-free reset operation of the protective equipment by very simple means.

Obviously many modifications and variations of the present invention are possible in the light of the above teachings. It is therefore to be understood that within the scope of the appended claims the invention may be practiced otherwise than as specifically described.

I claim:

1. In a system for deactivating a self-excited, D.C. generator after a fault, said system having a two-section generator bus connected to receive the output of said generator, a main bus and a reverse-current relay connected between the generator bus and the main bus, a contactor connected to be energized upon the occurrence of a generator fault, said contactor having a pair of electrically connected poles, one being biased to operate more rapidly than the other, said poles normally linking said two sections of generator bus, but disconnecting said sections upon energization of said contactor, the faster contact pole being associated with that section of generator bus which is electrically closer to the main bus, a flexible lead connected to said contact poles, and a current-limiting impedance connected between said flexible lead and that section of generator bus which is closer electrically to said main bus, the unsynchronous operation of said contact poles maintaining a current path for any reverse current through said reverse-current relay and said impedance limiting any such reverse current to a reasonable non-injurious value.

2. A device as set forth in claim 1, wherein said impedance comprises a resistor.

3. In a system for deactivating a self-excited, D.C. generator after a fault, said system having a two-section generator bus connected to receive the output of said generator, a main bus and a reverse-current relay connected between the generator bus and the main bus, a contactor connected to be energized upon the occurrence of a generator fault, said contactor having a pair of electrically connected poles, one being biased to operate more rapidly than the other, each pole having associated therewith a pair of contact terminals, one of the contact terminals associated with the rapid pole being connected to that section of generator bus which is electrically closer to said main bus and the other of the contact terminals being connected to a point of reference potential for said system, both of the contact terminals associated with the slow-pole being connected to that section of generator bus which receives the output of said generator, said poles normally linking said two sections of generator bus but disconnecting said sections upon energization of said contactor at which time said rapid pole contacts said contact terminal which is connected to said point of reference potential, a flexible lead connected to said contact poles, and a current-limiting resistor connected between said flexible lead and that section of generator bus which is electrically closer to said main bus, the unsynchronous operation of said contact poles maintaining a current path for any reverse current through said reverse-current relay and said resistor limiting any such reverse current to a reasonable, non-injurious value.

4. In a system for deactivating a self-excited, D.C. generator after a fault, said system having a two-section generator bus connected to receive the output of said generator, a main bus, a reverse-current relay connected between the generator bus and the main bus, and means for sensing generator faults and for providing an output upon occurrence of such faults, a contactor connected to receive the output of said fault-sensing means and to be energized thereby, said contactor having a pair of electrically connected poles, one pole being biased to operate more rapidly than the other, said poles normally linking said two sections of generator bus, but disconnecting said sections upon energization of said contactor and grounding said pair of poles, the faster contact pole being associated with that section of generator bus which is electrically closer to the main bus, a flexible lead connected to said contact poles, and a current-limiting impedance connected between said flexible lead and that section of generator bus which is closer electrically to said main bus, the unsynchronous operation of said contact poles maintaining a current path for any reverse current through said reverse-current relay and said impedance limiting any such reverse current to a reasonable non-jurious value.

5. A device as set forth in claim 4, wherein said impedance comprises a resistance.

6. In a system for deactivating a self-excited, D.C. generator after a fault, said system having a two-section generator bus connected to receive the output of said generator, a main bus, a reverse-current relay connected between the generator bus and the main bus, and means for sensing generator faults and for providing an output upon occurrence of such faults, a contactor connected to receive the output of said fault-sensing means and to be energized thereby, said contactor having a pair of electrically connected poles and a ground terminal associated with one said pole, one said pole being biased to operate more rapidly than the other, said poles normally linking said two sections of generator bus but disconnecting said sections upon energization of said contactor, one said pole thereupon being connected to said ground terminal, the faster contact pole being associated with that section of generator bus which is electrically closer to the main bus, a flexible lead connected to said contact poles, and a current-limiting impedance connected between said flexible lead and that section of generator bus which is closer electrically to said main bus.

7. A device as set forth in claim 6, wherein said impedance comprises a resistance.

References Cited in the file of this patent
UNITED STATES PATENTS

| | | |
|---|---|---|
| 2,534,895 | Austin | Dec. 19, 1950 |
| 2,710,367 | Clark | June 7, 1955 |

OTHER REFERENCES

Miner (Westinghouse Engineer), vol. 10, Issue 5, September 1950, pp. 212–216.

"Short-Circuiting Techniques for Deactivating a Faulty Aircraft Generator," Electrical Engineering, August 1952, pp. 703–705.